US009442445B2

(12) United States Patent
Hashimoto

(10) Patent No.: US 9,442,445 B2
(45) Date of Patent: Sep. 13, 2016

(54) IMAGE FORMING APPARATUS AND IMAGE READING APPARATUS

(75) Inventor: Naoki Hashimoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 581 days.

(21) Appl. No.: 13/370,619

(22) Filed: Feb. 10, 2012

(65) Prior Publication Data

US 2012/0218597 A1 Aug. 30, 2012

(30) Foreign Application Priority Data

Feb. 28, 2011 (JP) ................................ 2011-041198

(51) Int. Cl.
*G06F 3/12* (2006.01)
*G03G 15/00* (2006.01)

(52) U.S. Cl.
CPC *G03G 15/5004* (2013.01); *G03G 2215/00978* (2013.01)

(58) Field of Classification Search
CPC ........................................... G03G 2215/00978
See application file for complete search history.

(56) References Cited

U.S. PATENT DOCUMENTS 6,184,875 B1 2/2001 Matsuura
2002/0144023 A1* 10/2002 Kawabuchi ........... G06F 3/1204 710/5
2007/0218938 A1* 9/2007 Carter ............... H04W 52/0251 455/528
2007/0242301 A1* 10/2007 Tsuchie et al. .............. 358/1.14
2007/0247467 A1* 10/2007 Kaneda .............. G03G 15/5004 345/531
2008/0075498 A1* 3/2008 Kojo ............................... 399/85
2008/0114996 A1* 5/2008 Suzuki .......................... 713/320
2009/0248890 A1* 10/2009 Shouno ............. H04N 1/00204 709/232
2009/0316178 A1* 12/2009 Tanaka ......................... 358/1.14
2010/0064157 A1 3/2010 Matsuura et al.
2010/0312946 A1* 12/2010 Bold ..................... G06F 1/3203 711/102

FOREIGN PATENT DOCUMENTS

JP H01-133069 A 5/1989
JP H11-015606 A 1/1999
JP 2001-345980 A 12/2001

(Continued)

OTHER PUBLICATIONS

Japan Patent Office, Notification of Reason for Refusal for Japanese Patent Application No. 2011-041198 (counterpart Japanese patent application), dispatched Jan. 22, 2013.

(Continued)

*Primary Examiner* — Benjamin O Dulaney
(74) *Attorney, Agent, or Firm* — Merchant & Gould P.C.

(57) ABSTRACT

An image forming apparatus includes: a receiving unit; a printing unit; a power feed unit including a non-power saving mode and a power saving mode, the power feed unit configured to change the mode; an input unit configured to receive an input of a switching instruction; a switching unit configured to switch the mode from the non-power saving mode to the power saving mode when a stop condition is satisfied, the switching unit configured to switch the mode when the switching instruction is input; and a change unit configured to change the stop condition to a second condition which is more likely not to be satisfied than a first condition, after the mode is changed from the non-power saving mode to the power saving mode and when the mode is switched from the power saving mode to the non-power saving mode by the switching instruction.

3 Claims, 10 Drawing Sheets

(56) References Cited

FOREIGN PATENT DOCUMENTS

| | | | |
|---|---|---|---|
| JP | 2005-309016 | A | 11/2005 |
| JP | 2006-256116 | A | 9/2006 |
| JP | 2007-180989 | A | 7/2007 |
| JP | 2007-293729 | A | 11/2007 |
| JP | 2009-061634 | A | 3/2009 |
| JP | 2009-093419 | A | 4/2009 |
| JP | 2009-198730 | A | 9/2009 |
| JP | 2010-002500 | A | 1/2010 |
| JP | 2010-064315 | A | 3/2010 |
| JP | 2010-123080 | A | 6/2010 |
| JP | 2010-194884 | A | 9/2010 |
| JP | 2010-208232 | A | 9/2010 |
| JP | 2010-211372 | A | 9/2010 |

OTHER PUBLICATIONS

European Patent Office, extended European Search Report for European Patent Application No. 12152055.5 (counterpart European patent application), dated Aug. 27, 2012.

Office Action issued in European Application No. 12152055.5, mailed Nov. 11, 2015.

* cited by examiner

FIG. 4

| | IMAGE FORMING | IMAGE READING | CONTROL UNIT | OPERATION PANEL | CANCELLATION KEY |
|---|---|---|---|---|---|
| READY MODE | ○ | ○ | ○ | ○ | ○ |
| SLEEP MODE | × | × | ○ | ○ | ○ |
| POWER SAVING MODE | × | × | × | × | ○ |

IMAGE FORMING APPARATUS AND IMAGE READING APPARATUS

CROSS REFERENCE TO RELATED APPLICATION

The present application claims priority from Japanese Patent Application No. 2011-041198, which was filed on Feb. 28, 2011, the disclosure of which is herein incorporated by reference in its entirety.

TECHNICAL FIELD

The present invention relates to an image forming apparatus and an image reading apparatus having a power saving mode that reduces power consumption. More particularly, the present invention relates to an image forming apparatus and an image reading apparatus that cut the supply of power to a communication unit in a power saving mode.

BACKGROUND

Apparatuses treating images, such as image forming apparatuses or image reading apparatuses, have been proposed which stop some functions while being used and change the mode to the power saving mode which reduces power consumption, in order to reduce power consumption.

For example, Patent Document 1 discloses an image forming apparatus which changes the mode to the power saving mode when an unused state is maintained for a predetermined period of time or more. In addition, Patent Document 1 discloses a technique that cuts the supply of power to a communication interface for communication with an external apparatus in the power saving mode.

RELATED ART DOCUMENT

Patent Document

[Patent Document 1] JP-A-2001-345980

SUMMARY

However, the apparatus according to the related art has the following problems. That is, conditions for changing to the power saving mode need to be improved. For example, when the supply of power to the communication interface for communication with the external apparatus is cut in the power saving mode, communication with the external apparatus is unavailable and it is difficult to receive a job. Therefore, in order to input a job to the apparatus which is changed to the power saving mode, the user needs to move to the apparatus, cancel the power saving mode, return to the external apparatus, and input an instruction to transmit a job. In this case, when a stop condition for changing to the power saving mode is likely to be satisfied, the apparatus is changed to the power saving mode again before the user inputs a job. As a result, it takes a lot of time and effort for the user to input a job. On the other hand, when the stop condition for changing to the power saving mode is less likely to be satisfied, a chance to operate the apparatus in the power saving mode is reduced, which makes it difficult to reduce power consumption.

The invention has been made in order to solve the problems of the apparatus according to the related art. That is, an object of the invention is to provide an image forming apparatus and an image reading apparatus capable of effectively switching the mode between a power saving mode and a non-power saving mode.

According to an aspect of the present invention, there is provided an image forming apparatus comprising: a receiving unit that is configured to receive print data transmitted from an external apparatus; a printing unit that is configured to print the print data received by the receiving unit; a power feed unit that includes a non-power saving mode in which power is supplied to the receiving unit and a power saving mode in which no power is supplied to the receiving unit, the power feed unit configured to change the mode to control the supply of power to the receiving unit; an input unit that is configured to receive an input of a switching instruction to switch the mode of the power feed unit from the power saving mode to the non-power saving mode; a switching unit that is configured to switch the mode of the power feed unit from the non-power saving mode to the power saving mode when a stop condition which stops the supply of power to the receiving unit is satisfied, the switching unit configured to switch the mode of the power feed unit from the power saving mode to the non-power saving mode when the switching instruction is input by the input unit; and a change unit that is configured to change the stop condition to a second condition which is more likely not to be satisfied than a first condition which is used before the mode is changed to the power saving mode, after the mode of the power feed unit is changed from the non-power saving mode to the power saving mode and when the mode of the power feed unit is switched from the power saving mode to the non-power saving mode by the switching instruction.

The image forming apparatus according to the first aspect of the invention has the power saving mode and the non-power saving mode as the modes for controlling the supply of power to the receiving unit. In addition, the image forming apparatus has at least two stop conditions for changing the mode from the non-power saving mode to the power saving mode. Of the two stop modes, the second condition is less likely to be satisfied than the first condition. When the mode is switched from the power saving mode to the non-power saving mode, the image forming apparatus changes the stop condition from the first condition to the second condition.

That is, in the image forming apparatus according to the first aspect of the invention, the stop condition is the first condition before the mode is switched to the power saving mode. The stop condition is changed to the second condition which is less likely to be satisfied than the first condition when the mode is switched from the power saving mode to the non-power saving mode. In this way, after the user inputs a switching instruction to switch the mode from the power saving mode to the non-power saving mode, the possibility of the mode returning to the power saving mode again is reduced. As a result, it is possible to gain time until the user inputs an instruction to transmit print data. Since the stop condition for changing to the power saving mode is the first condition at the beginning, the possibility of the mode being changed to the power saving mode is high, which contributes to reducing power consumption.

The image forming apparatus according to the first aspect of the invention may further include an operation unit that receives an operation from a user. The stop condition may be that the length of a non-use time defined by a duration for which the printing unit does not perform printing or a duration for which the printing unit does not perform printing and the operation unit does not receive the operation from the user is equal to or more than a predetermined period of time. The predetermined period of time of the second condition may be longer than that of the first condition. As in this structure, it is preferable to define the condition for changing to the power saving mode using the non-use time, in order to reduce power consumption.

The second condition may be not satisfied at least until the printing unit performs a printing operation. In addition, the second condition may be nothing (the second condition is maintained until the power supply is reset). According to this structure, it is possible to reduce the time and effort required for the user to operate the apparatus.

The image forming apparatus according to the first aspect of the invention may further include a setting unit that sets at least one of the first condition and the second condition according to the operation of the user. According to this structure, it is possible to change the conditions according to the operation of the user and thus improve convenience.

When the switching instruction is input by the input unit, the setting unit may set the second condition according to the operation of the user. The user who cancels the power saving mode sets a necessary condition. In this way, user convenience is improved. For example, when the stop condition is based on the length of the non-use time and the threshold time of the first condition is a predetermined period of time, the second condition may be that the time which is extended from the predetermined period of time and is acquired by the user is the threshold time.

In the image forming apparatus according to the first aspect of the invention, when the stop condition is changed to the second condition and the printing unit prints the print data, the change unit may change the stop condition from the second condition to the first condition. After printing ends, it is preferable to return the stop condition to the first condition, in order to reduce power consumption.

The image forming apparatus according to the first aspect of the invention may further include an identifying unit that identifies the user who inputs the switching instruction and a determining unit that determines the user who has the print data received by the receiving unit. When the stop condition is changed to the second condition and the printing unit prints the print data, the determining unit may determine the user of the print data and the change unit may change the stop condition from the second condition to the first condition on condition that the determined user is identical to the user identified by the identifying unit. Since the user who switches the mode to the non-power saving mode and the user of the print data are checked, it is possible to avoid the mode from being switched to the power saving mode by a print instruction from a third party (users other than the user who switches the mode to the non-power saving mode).

According to a second aspect of the invention, an image forming apparatus includes: a receiving unit that receives print data transmitted from an external apparatus; a printing unit that prints the print data received by the receiving unit; a power feed unit that includes a non-power saving mode in which power is supplied to the receiving unit and a power saving mode in which no power is supplied to the receiving unit and changes the mode to control the supply of power to the receiving unit; an input unit that receives an input of a switching instruction to switch the mode of the power feed unit from the power saving mode to the non-power saving mode; a switching unit that switches the mode of the power feed unit from the non-power saving mode to the power saving mode when a stop condition which stops the supply of power to the receiving unit is satisfied and switches the mode of the power feed unit from the power saving mode to the non-power saving mode when the switching instruction is input by the input unit; and a change unit that changes the stop condition to a fourth condition which is more likely to be satisfied than a third condition used after the mode is changed to the non-power saving mode, when the mode of the power feed unit is switched from the power saving mode to the non-power saving mode by the switching unit and the printing unit prints the print data.

That is, the image forming apparatus according to the second aspect of the invention has at least two stop conditions for switching the mode from the non-power saving mode to the power saving mode. In the image forming apparatus, after the mode is switched from the power saving mode to the non-power saving mode and the print data is printed, the stop condition is changed. Specifically, the fourth condition used after the mode is changed is more likely to be satisfied than the third condition used when the mode is changed to the non-power saving mode. In this way, after the printing of print data with the mode returning to the non-power saving mode ends, it is possible to rapidly return the mode to the power saving mode and thus further reduce power consumption. Since the mode rapidly returns to the power saving mode after the printing of print data with the mode returning to the non-power saving mode ends, an influence on a reduction in power consumption is small even when the third condition used immediately after the mode returns to the non-power saving mode is less likely to be satisfied. Therefore, since the third condition is less likely to be satisfied, it can be expected to gain time until the user inputs an instruction to transmit print data.

According to a third aspect of the invention, an image reading apparatus includes: a receiving unit that receives a scan instruction transmitted from an external apparatus; a reading unit that reads a document in response to the scan instruction received by the receiving unit; a power feed unit that includes a non-power saving mode in which power is supplied to the receiving unit and a power saving mode in which no power is supplied to the receiving unit and changes the mode to control the supply of power to the receiving unit; an input unit that receives an input of a switching instruction to switch the mode of the power feed unit from the power saving mode to the non-power saving mode; a switching unit that switches the mode of the power feed unit from the non-power saving mode to the power saving mode when a stop condition which stops the supply of power to the receiving unit is satisfied and switches the mode of the power feed unit from the power saving mode to the non-power saving mode when the switching instruction is input by the input unit; and a change unit that changes the stop condition to a second condition which is more likely not to be satisfied than a first condition used before the mode is changed to the power saving mode, after the mode of the power feed unit is changed from the non-power saving mode to the power saving mode and when the mode of the power feed unit is switched from the power saving mode to the non-power saving mode by the switching instruction.

According to a fourth aspect of the invention, an image reading apparatus includes: a receiving unit that receives a scan instruction transmitted from an external apparatus; a reading unit that reads a document in response to the scan instruction received by the receiving unit; a power feed unit that includes a non-power saving mode in which power is supplied to the receiving unit and a power saving mode in which no power is supplied to the receiving unit and changes the mode to control the supply of power to the receiving unit; an input unit that receives an input of a switching instruction to switch the mode of the power feed unit from the power saving mode to the non-power saving mode; a switching unit that switches the mode of the power feed unit from the non-power saving mode to the power saving mode when a stop condition which stops the supply of power to the receiving unit is satisfied and switches the mode of the power feed unit from the power saving mode to the non-power saving mode when the switching instruction is input by the input unit; and a change unit that changes the stop condition to a fourth condition which is more likely to be satisfied than a third condition used after the mode is changed to the non-power saving mode, when the mode of the power feed unit is switched from the power saving mode to the non-power saving mode by the switching unit and the reading unit reads the document.

According to the invention, it is possible to achieve an image forming apparatus and an image reading apparatus capable of effectively switching the mode between the power saving mode and the non-power saving mode.

BRIEF DESCRIPTION OF THE DRAWINGS

Illustrative aspects of the invention will be described in detail with reference to the following figures wherein:

FIG. 4 is a diagram illustrating the relation between various kinds of modes and power feed conditions;

DETAILED DESCRIPTION OF EXEMPLARY EMBODIMENTS OF THE PRESENT INVENTION

Hereinafter, an apparatus according to an exemplary embodiment of the invention will be described in detail with reference to the accompanying drawings. This embodiment of the invention is applied to a multi-function peripheral (MFP) having a power saving mode for reducing power consumption.

[Structure of MFP]

Figure 1:
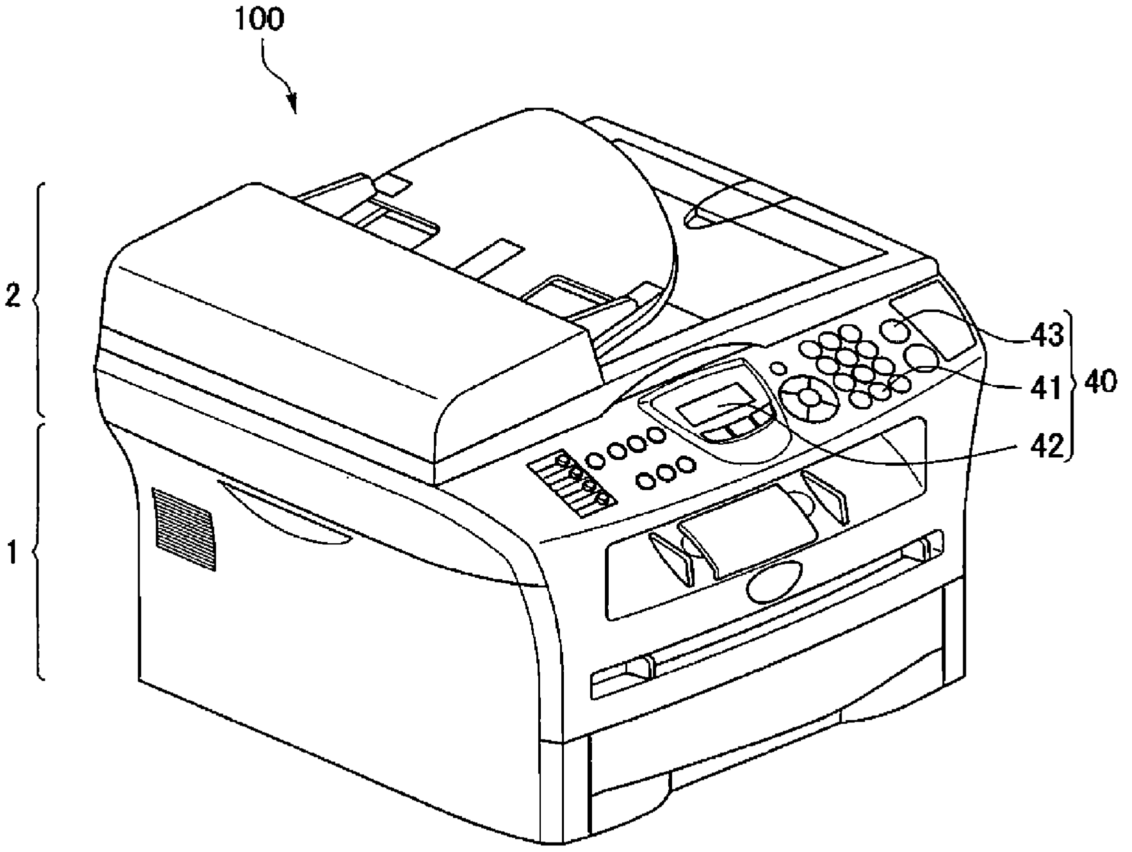
FIG. 1 is a perspective view illustrating the outward appearance of an MFP according to an embodiment.

As shown in FIG. 1, an MFP 100 includes an image forming unit 1 (an example of a printing unit) that prints an image on a sheet and an image reading unit 2 (an example of a reading unit) that reads a document. The image forming type of the image forming unit 1 may be an electrophotographic type or an ink-jet type. The image forming unit 1 may form a color image or just a monochrome image.

The MFP 100 has an operation panel 40 (an example of an operation unit) having a button group 41 including various kinds of buttons (for example, buttons, such as a start key, a stop key, and numeric keys) and a display unit 42, which is a liquid crystal display, provided on the front side thereof. The button group 41 or the display unit 42 can display an operating state or it can be used by the user to input an operation.

In particular, the button group 41 of the operation panel 40 includes a cancellation key 43 (an example of an input unit) for cancelling the power saving mode. When the user presses the cancellation key 43 while the MFP 100 operates in the power saving mode, the mode related to power supply is changed from the power saving mode to the ready mode. Various kinds of modes will be described below.

[Electrical Structure of MFP]

Figure 2:
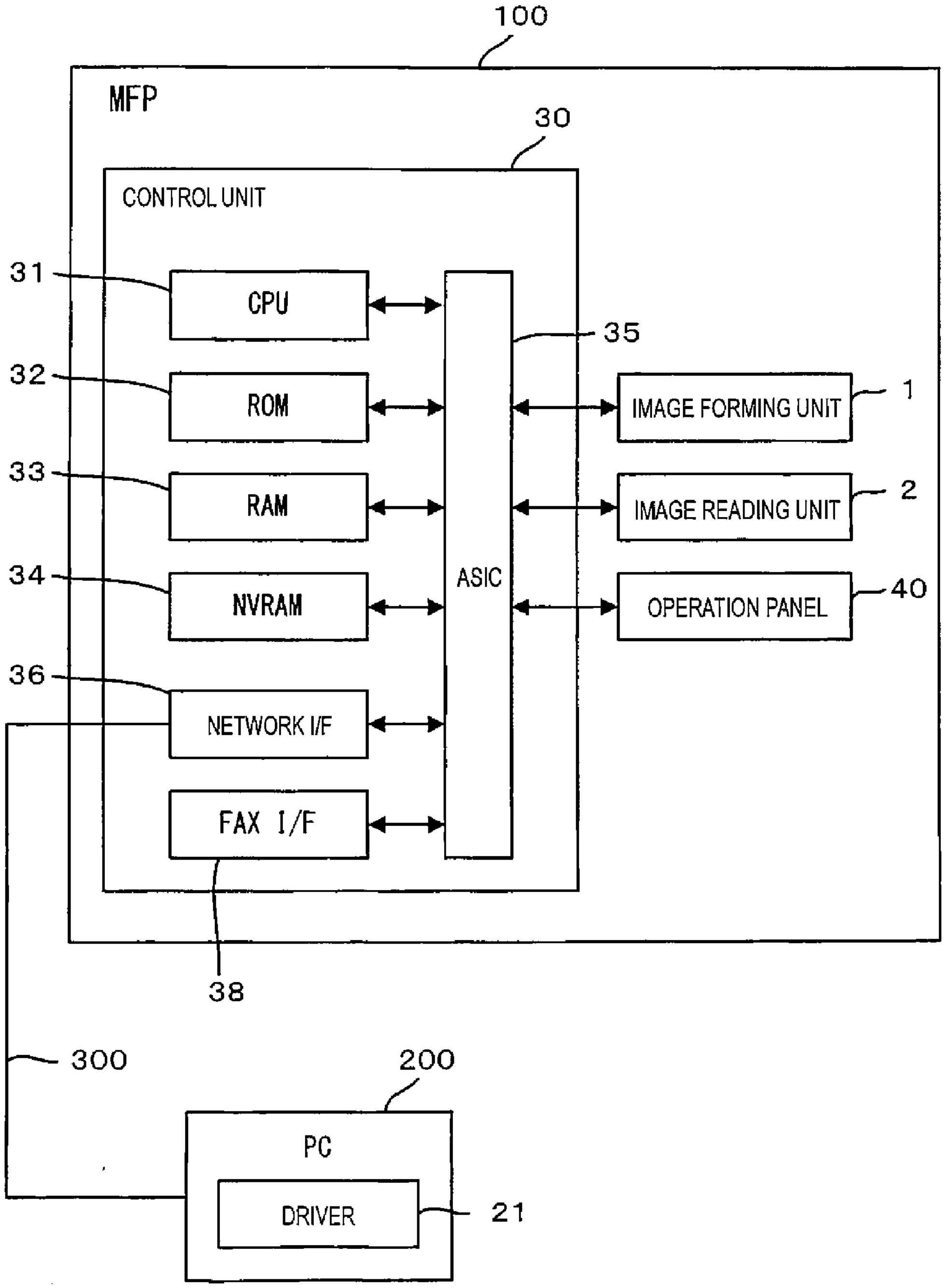
FIG. 2 is a block diagram illustrating the electrical structure of the MFP shown in FIG. 1.

Next, the electrical structure of the MFP 100 will be described. As shown in FIG. 2, the MFP 100 has a control unit 30 including a CPU 31, a ROM 32, a RAM 33, an NVRAM (non-volatile RAM) 34, an ASIC 35, a network interface 36, and a FAX interface 38.

The ROM 32 stores, for example, various kinds of control programs for controlling the MFP 100, image processing programs, various kinds of settings, and initial values. The RAM 33 is used as a work area in which various kinds of control programs are read or a storage area which temporarily stores the image data of the document read by the image reading unit 2 or image data transmitted through the network interface 36. The NVRAM 34 is non-volatile storage means and is used as a storage area that stores, for example, various kinds of settings or image data.

The ASIC 35 is electrically connected to, for example, the image forming unit 1, the image reading unit 2, and the operation panel 40. For example, the ASIC 35 acquires the signals of image data from the image reading unit 2. In addition, the ASIC 35 outputs signals for creating a desired image to the image forming unit 1. The ASIC 35 receives the signals of various kinds of buttons input to the button group 41. The ASIC 35 outputs the signals of content to be displayed on the display unit 42.

The CPU 31 (an example of a switching unit, a change unit, a setting unit, an identifying unit, and a determining unit) performs operations for implementing various kinds of functions of the IMFP 100, such as an image reading function, an image forming function, and a power feed control function and has a key role in the control of the apparatus. The CPU 31 controls various components of the MFP 100 through the IASIC 35 according to the control program read from the ROM 32 while storing the processing result in the RAM 33 or the NVRAM 34.

The network interface 36 (an example of a receiving unit) is connected to a network 300 and can perform data communication with another information processing apparatus (for example, a PC 200 having a printer driver 21 for the MFP 100 incorporated thereinto) through the network interface 36. The FAX interface 38 is connected to a public line and can perform data communication with, for example, an external FAX through the FAX interface 38.

[Power Feed Control]

Figure 3:
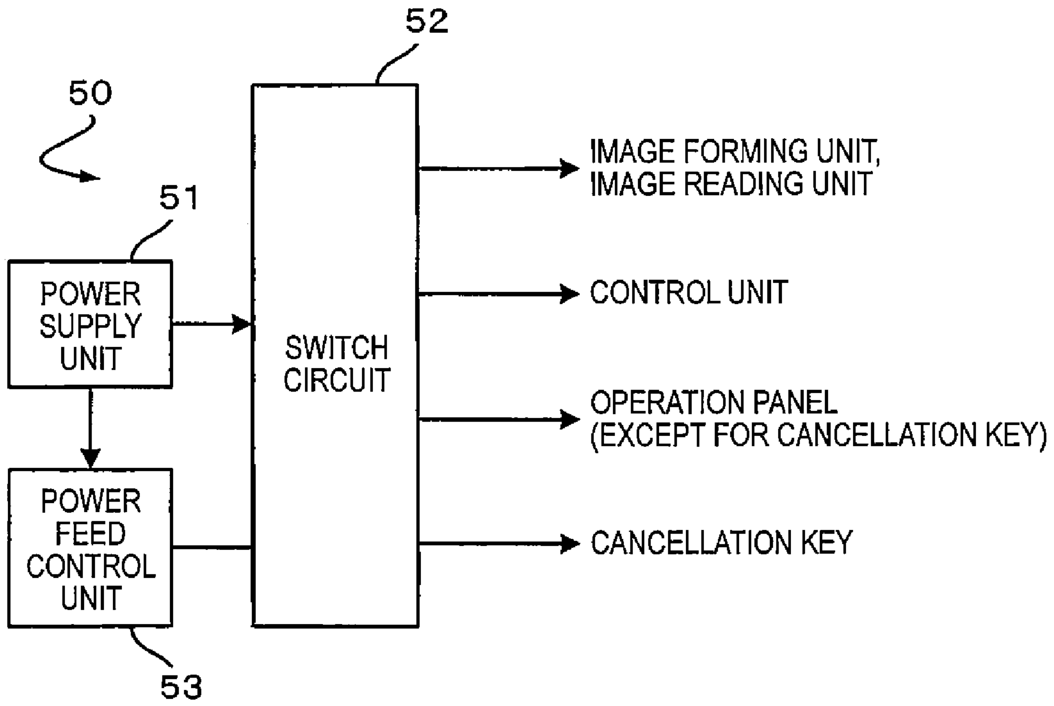
FIG. 3 is a perspective view illustrating the structure of a power feed control system.

Next, the power feed control of the MFP 100 will be described. As shown in FIG. 3, the MFP 100 includes, as a power feed control system 50 (an example of a power feed unit), a power supply unit 51, a switch circuit 52 that distributes power supplied from the power supply unit 51 to each component of the MFP 100, and a power feed control unit 53 that controls the turning-on or turning-off of various kinds of switches of the switch circuit 52.

The power supply unit 51 is connected to, for example, a commercial power supply or a battery, includes a circuit that converts power from the power supply into appropriate power, and supplies the converted power to various components of the MFP 100. The switch circuit 52 performs a switching operation to determine whether to supply power to various components of the MFP 100 according to the mode. Specifically, the MFP 100 includes various kinds of power supply lines, such as a power supply line to the image forming unit 1 or the image reading unit 2, a power supply line to the control unit 30, a power supply line to the operation panel 40 except for the cancellation key 43, and a power supply line to the cancellation key 43. The switch circuit 52 switches the turning-on or turning-off of power supply to various kinds of power supply lines.

Next, the modes of the power feed control system 50 will be described. The power feed control system 50 includes the ready mode (an example of a non-power saving mode) in which an image can be read or printed, data can be transmitted or received, and an operation can be received through the operation panel, the sleep mode in which data can be transmitted or received, an operation can be received through the operation panel, and an image cannot be read or printed, and the power saving mode in which the reading or printing of an image, the transmission or reception of data, and the reception of an operation through the operation panel are unavailable and only the reception of the cancellation key 43 is available. The cancellation key 43 is for inputting an instruction to change the sleep mode or the power saving mode to the ready mode. In the ready mode, the pressing of the cancellation key 43 is disregarded.

FIG. 4 shows the relation between various kinds of modes and power feed conditions. In FIG. 4, symbol "O" indicates that power is supplied and symbol "x" indicates that no power is supplied. As shown in FIG. 4, in the ready mode, power is supplied to all of the image forming unit 1, the image reading unit 2, the control unit 30, and the operation panel 40 such that a printing operation or a scanning operation can be performed. Immediately after the MFP 100 starts, it operates in the ready mode. In the ready mode, when conditions for changing to the sleep mode are satisfied, the mode is changed to the sleep mode.

In the sleep mode, the supply of power to the image forming unit 1 and the image reading unit 2 is cut. That is, the supply of power to a fixing device or an image sensor having large power consumption is cut to reduce power consumption. The supply of power to the control unit 30 or the operation panel 40 is maintained, and instructions or jobs are received from the user. In the sleep mode, when conditions for changing to the power saving mode are satisfied, the mode is changed to the power saving mode. When conditions for changing to the ready mode are satisfied, the mode is changed to the ready mode.

In the power saving mode, the supply of power to the image forming unit 1, the image reading unit 2, the control unit 30, and the operation panel 40 is cut. That is, since the supply of power to the network interface 36 and the FAX interface 38 is also cut, the transmission or reception of data is unavailable. In addition, it is difficult to receive operations other than the cancellation key 43 of the operation panel 40. In this way, power consumption is less than that in the sleep mode. On the other hand, the supply of power to the cancellation key 43 is maintained. That is, the cancellation key 43 is controlled by a circuit different from the control unit 30 and receives an input from the user in the power saving mode. In the power saving mode, when the cancellation key 43 is pressed, the mode is changed to the ready mode.

The power feed control unit 53 inputs a signal for turning on or off the supply of power to various kinds of power supply lines to the switch circuit 52 in the operation mode of the MFP 100. The power feed control unit 53 is directly supplied with power from the power supply unit 51 and operates even in the power saving mode. Therefore, even in the power saving mode, the power feed control unit 53 can monitor an input to the cancellation key 43 and control the switch circuit 52.

[Mode Switching Process]

[First Aspect]

Figure 5:
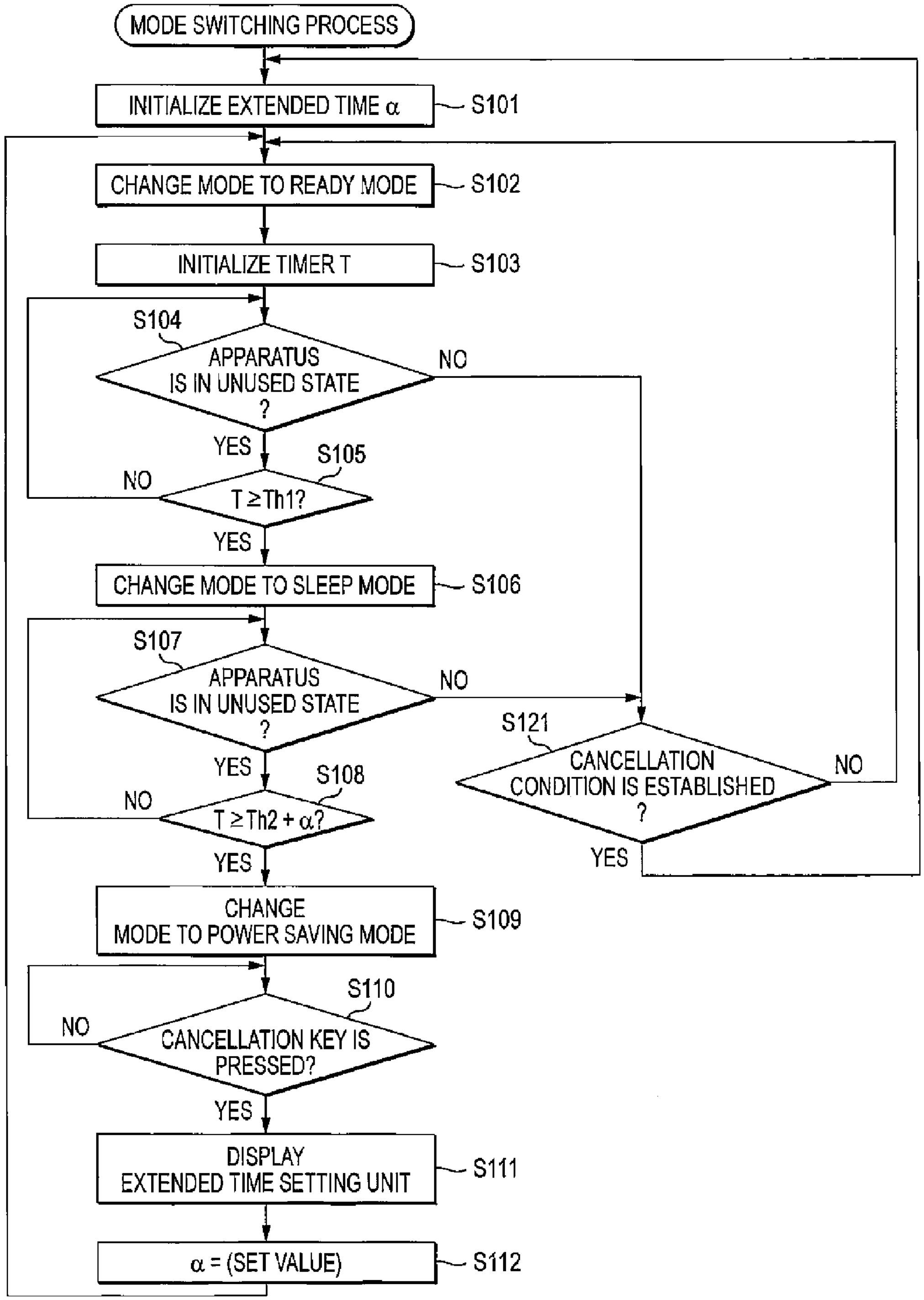
FIG. 5 is a flowchart illustrating the procedure of a mode switching process according to a first aspect.

Next, the procedure of a mode switching process (an example, a switching unit, a change unit, and a setting unit) for implementing the mode switching operation will be described with reference to the flowchart shown in FIG. 5. The mode switching process is performed by the CPU 31 when the main power supply of the MFP 100 is changed from an off state to an on state.

In a first aspect, first, the MFP 100 initializes an extended time $\alpha$ to 0 (S101). The extended time $\alpha$ is used for conditions (stop conditions) for changing to the power saving mode. Then, the mode is changed to the ready mode and the supply of power to various components of the MFP 100 starts (S102). Then, a timer T that measures the time (hereinafter, referred to as non-use time) for which the MFP 100 is not used (the duration for which no printing, reading, and panel operations are performed) is initialized to 0 and the timer T starts to measure time (S103)

Then, it is determined whether the MFP is in an unused state in which no printing, reading, and panel operations are performed (S104). When the MFP is in the unused state (S104: YES), it is determined whether the value of the timer T is equal to or more than a threshold time Th1 (S105). That is, it is determined whether the non-use time reaches the threshold time Th1. When the non-use time does not reach the threshold time Th1 (S105: NO), the process returns to Step S104.

When the non-use time reaches the threshold time Th1 (S105: YES), the mode is changed to the sleep mode (S106). That is, the supply of power to the image forming unit 1 and the image reading unit 2 is cut. Then, it is continuously determines whether the MFP is in the unused state (S107). When the MFP is in the unused state (S107: YES), it is determined whether the value of the timer T is equal to or more than the sum of a threshold time Th2 and the extended time $\alpha$ (S108). The threshold time Th2 is longer than the threshold time Th1. The extended time $\alpha$ is 0 in the modes other than the power saving mode. When the non-use time does not reach the sum of the threshold time Th2 and the extended time $\alpha$ (S108: NO), the process returns to Step S107.

When the non-use time reaches the sum of the threshold time Th2 and the extended time $\alpha$ (S108: YES), the mode is changed to the power saving mode (S109). That is, the supply of power to the operation panel 40 except for the control unit 30 and the cancellation key 43 is cut.

After Step S109, it is determined whether the cancellation key 43 is pressed (S110). When the cancellation key 43 is not pressed (S110: NO), the MFP waits for the pressing of the cancellation key 43 by the user.

Figure 6:
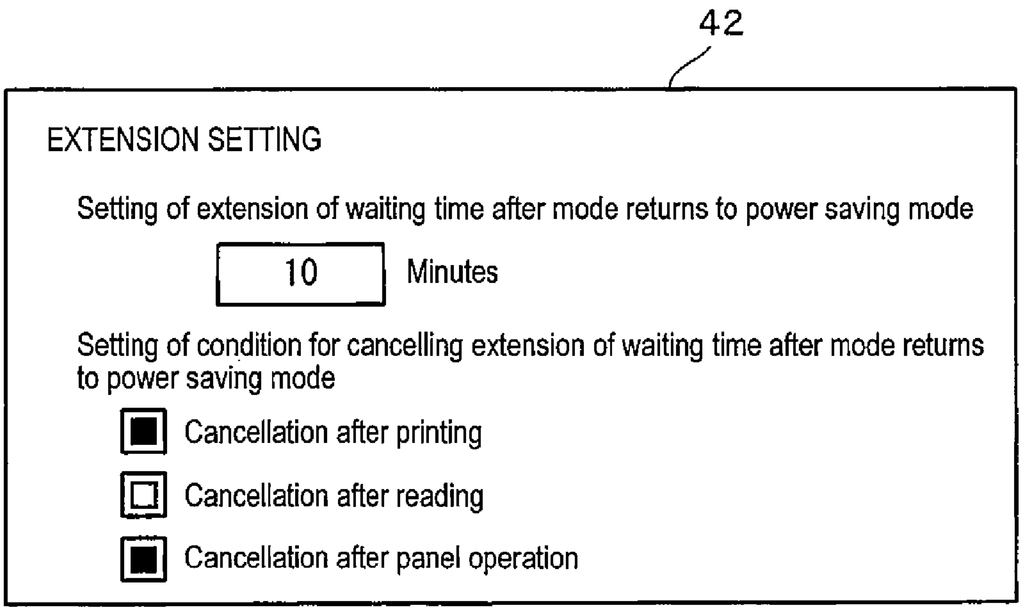
FIG. 6 is a diagram illustrating an example of a time extension setting screen.

When the cancellation key 43 is pressed (S110: YES), the supply of power to the control unit 30 and the operation panel 40 is resumed and a time extension setting screen is displayed on the display unit 42 (S111). On the time extension setting screen, as shown in FIG. 6, the extended time from the non-use time required to change to the power saving mode is set. The set time is the extended time $\alpha$ (S112). In addition, a cancellation condition for resetting the extended time $\alpha$ is set. The cancellation condition includes three conditions, that is, the execution of printing, the execution of reading, and the execution of a panel operation. The user sets the cancellation condition, if needed.

After the extended time is set, the process returns to Step S102 and the mode is changed to the ready mode. That is, the supply of power to the image forming unit 1 and the image reading unit 2 is resumed. After the power supply is resumed, the extended time α set in Step S112 is used to determine whether the mode is changed to the power saving mode in Step S108. In this way, the length of the non-use time required to change to the power saving mode is longer than that before the mode is changed to the power saving mode. When an extended time of 0 is input on the time extension setting screen, the length of the non-use time required to change to the power saving mode is equal to that before the mode is changed to the power saving mode.

On the other hand, when it is determined in Step S104 or S107 that the MFP is not in the unused state, that is, when any one of printing, reading, and a panel operation is performed (S104: NO, S107: NO), it is determined whether the cancellation condition set on the time extension setting screen in Step S111 is satisfied (S121). For example, when the cancellation condition is the execution of printing, it is determined whether printing has been performed.

When the cancellation condition is satisfied (S121: YES), the process returns to Step S101. The extended time α is reset and the mode is changed to the ready mode. In this way, a stop condition returns to the condition during startup. When the cancellation condition is not satisfied (S121: NO), the process returns to Step S102. The extended time α is not reset and the mode is changed to the ready mode. Before the mode is changed to the power saving mode, the cancellation condition is not set. Therefore, the cancellation condition is not satisfied.

When a plurality of cancellation conditions are set and at least one of the cancellation conditions is satisfied in Step 121, it is determined that the cancellation conditions are satisfied. Therefore, when the user wants to reset the extended time α to the initial value and accelerate power saving, it is preferable to set many cancellation conditions. When no cancellation condition is set on the time extension setting screen, the mode is changed to the power saving mode again and the extended time α is not reset until the cancellation condition is set. Therefore, when printing or reading is reliably performed, the cancellation conditions may not be set.

As described above, in the mode switching process according to the first aspect, when the mode returns from the power saving mode, it is possible to set the extended time α and increase the length of the non-use time required to change to the power saving mode. Therefore, the possibility that a condition (second condition) for a change to the power saving mode will be satisfied after the mode returns to the power saving mode is less than the possibility that a condition (first condition) for a change to the power saving mode will be satisfied before the mode is changed to the power saving mode. Therefore, after the user changes the mode from the power saving mode to the ready mode, it is possible to gain time until the user inputs, for example, an instruction to transmit print data and the possibility of the mode returning to the power saving mode again is low.

Since the stop condition when the mode is changed to the power saving mode during startup is the first condition in which the extended time α is 0, the possibility of the mode being changed to the power saving mode is high. After the cancellation conditions are satisfied, the extended time α is reset and the stop condition returns to the first condition. Therefore, this contributes to reducing power consumption.

[Second Aspect]

Figure 7:
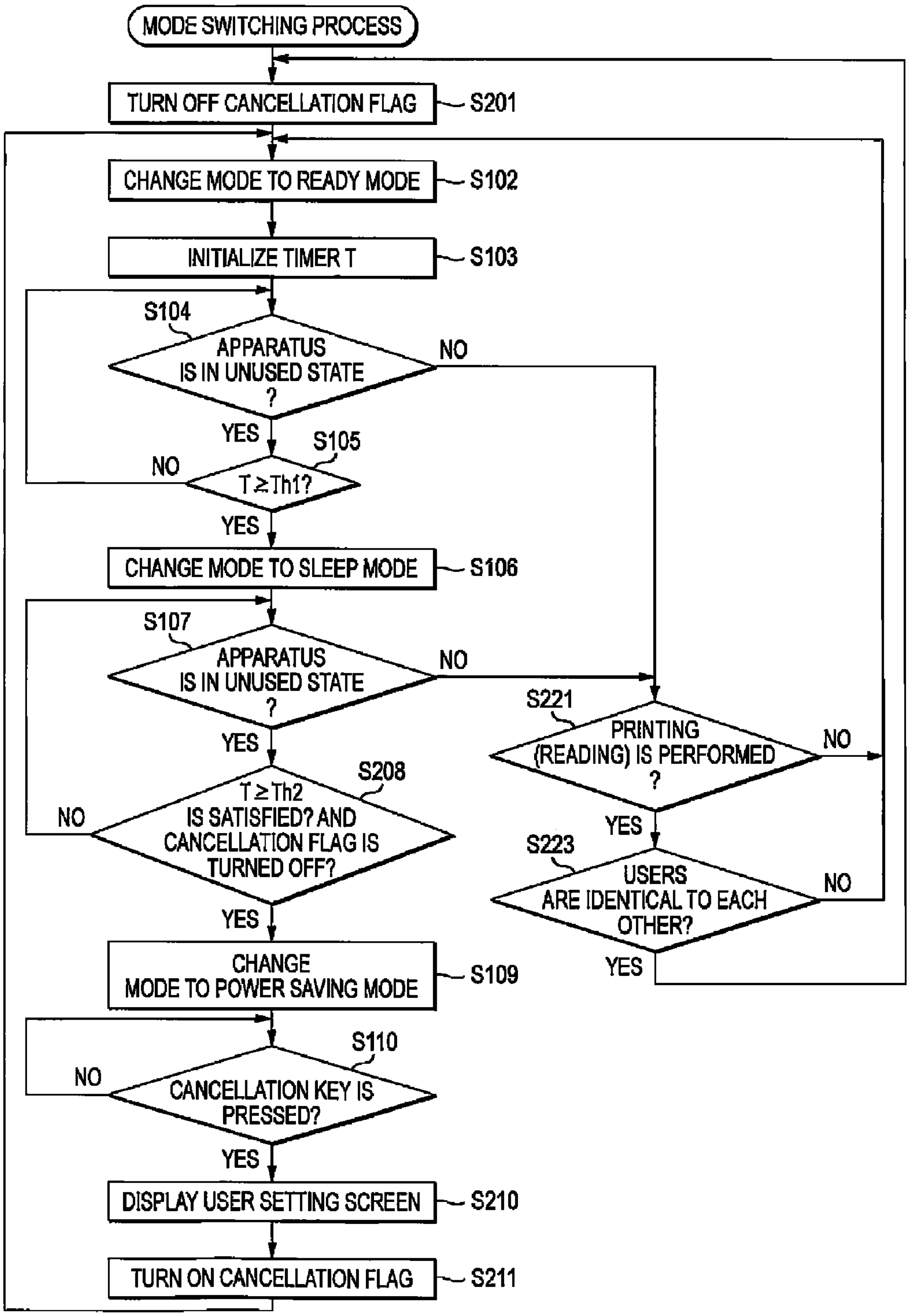
FIG. 7 is a flowchart illustrating the procedure of a mode switching process according to a second aspect.

Next, the procedure of a second aspect of the mode switching process (an example of a switching unit, a change unit, a setting unit, an identifying unit, and a determining unit) will be described with reference to the flowchart shown in FIG. 7. In the second aspect, when the user who cancels the power saving mode is identical to the user who inputs a job thereafter, a change to the power saving mode is allowed. This is the difference from the first aspect in which the stop condition is changed by the addition of the extended time α. The same steps as those in the first aspect are denoted by the same reference numerals and a description thereof will not be repeated.

In the second aspect, first, the MFP 100 turns off a cancellation flag (S201). The cancellation flag is used for the stop condition. Then, the mode is changed to the ready mode and the supply of power to various components of the MFP 100 starts (S102). Then, the timer T that measures the time for which the MFP 100 is not used is initialized to 0 and the timer T starts to measure time (S103).

Then, it is determined whether the MFP 100 is in an unused state (S104). When the MFP 100 is in the unused state (S104: YES), it is determined whether the value of the timer T is equal to or more than the threshold time Th1 (S105).

When the non-use time reaches the threshold time Th1 (S105: YES), the mode is changed to the sleep mode (S106). Then, it is continuously determined whether the MFP 100 is in the unused state (S107). When the MFP 100 is in the unused state (S107: YES), it is determined whether the value of the timer T is equal to or more than a threshold time Th2 and the cancellation flag is turned off (S208). The cancellation flag is turned off in the stage in which the mode is not changed to the power saving mode. When the conditions of Step S208 are not satisfied (S208: NO), the process returns to Step S107.

When the value of the timer T is equal to or more than the threshold time Th2 and the cancellation flag is turned off (S208: YES), the mode is changed to the power saving mode (S109). Then, it is determined whether the cancellation key 43 is pressed (S110).

Figure 8:
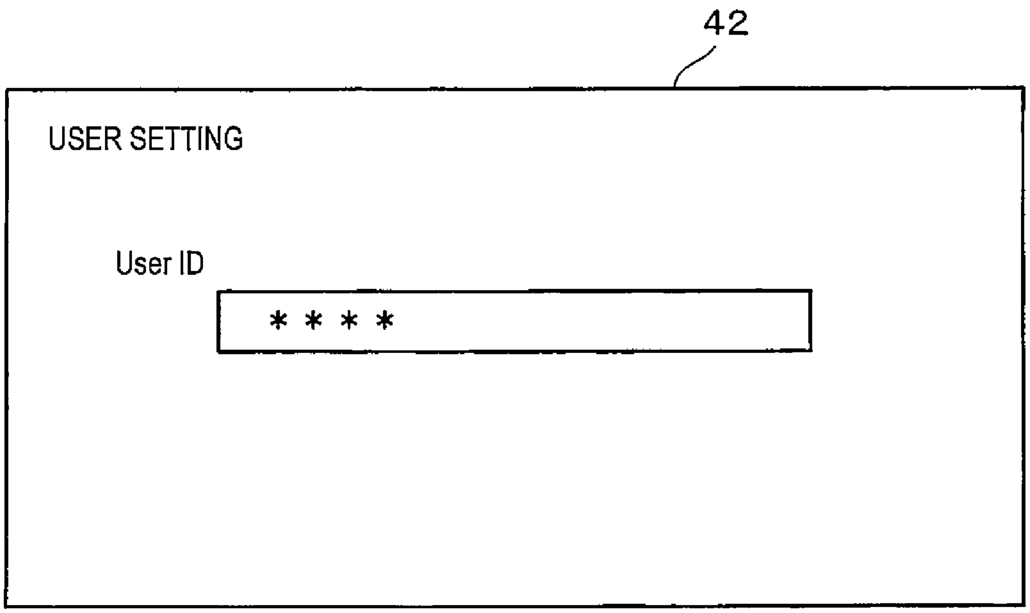
FIG. 8 is a diagram illustrating an example of a user setting screen.

When the cancellation key 43 is pressed (S110: YES), the supply of power to the control unit 30 and the operation panel 40 is resumed and a user setting screen is displayed on the display unit 42 (S210). As shown in FIG. 8, identification information for identifying the user who presses the cancellation key 43 is set on the user setting screen. The set identification information is stored in the RAM 33. When the identification information is not set, predetermined identification information (referred to as a "guest ID") is stored. After the identification information is set, the cancellation flag is turned on (S211). After Step S211, the process returns to Step S102 and the mode is changed to the ready mode. That is, the supply of power to the image forming unit 1 and the image reading unit 2 is resumed.

When it is determined in Step S104 or S107 that the MFP is not in the unused state (S104: NO, S107: NO), it is determined whether the image forming unit 1 performs printing or the image reading unit 2 performs reading (S221). When printing or reading is performed (S221: YES), it is determined whether the registered user is identical to the user who inputs a print job or a read job (S223). When the guest ID is registered, it is determined that the users are identical to each other, regardless of the print job or the read job.

When the users are identical to each other (S223: YES), the process returns to Step S201. The cancellation flag is turned off and the mode is changed to the ready mode. That is, when a job is received from the user who presses the cancellation key 43, the stop condition returns to the condition during startup. When the users are not identical to each other (S223: NO), or when neither printing nor reading is performed, that is, the operation panel 40 is operated (S221: NO), the process returns to Step S102. The cancellation flag is not turned off and the mode is changed to the ready mode.

As described above, in the mode switching process according to the second aspect, when the mode returns from the power saving mode, it is possible to set the user information to the stop condition. The cancellation flag is not turned off until the job from the user who returns the mode to the ready mode is processed. The conditions of Step S208 are not satisfied while the cancellation flag is turned on. That is, the stop condition (first condition) before the mode is changed to the power saving mode is satisfied only when the value of the timer T is equal to or more than the threshold time Th2. However, the stop condition (second condition) after the mode returns to the power saving mode includes a condition in which the cancellation flag is turned off, that is, the job from the user who returns the mode to the ready mode is processed, in addition to the above-mentioned conditions. Therefore, the possibility of the second condition being satisfied is lower than that of the first condition being satisfied. When the user presses the cancellation key 43 to change the mode from the power saving mode to the ready mode, it is possible to reliably process the job from the user.

Since the stop condition during startup is the first condition in which the length of the non-use time is compared with the threshold time Th2, the possibility of the mode being changed to the power saving mode is high. In addition, after the job from the user who returns the mode to the ready mode is processed, the cancellation flag is reset and the stop condition returns to the first condition. Therefore, this contributes to reducing power consumption.

[Third Aspect]

Figure 9:
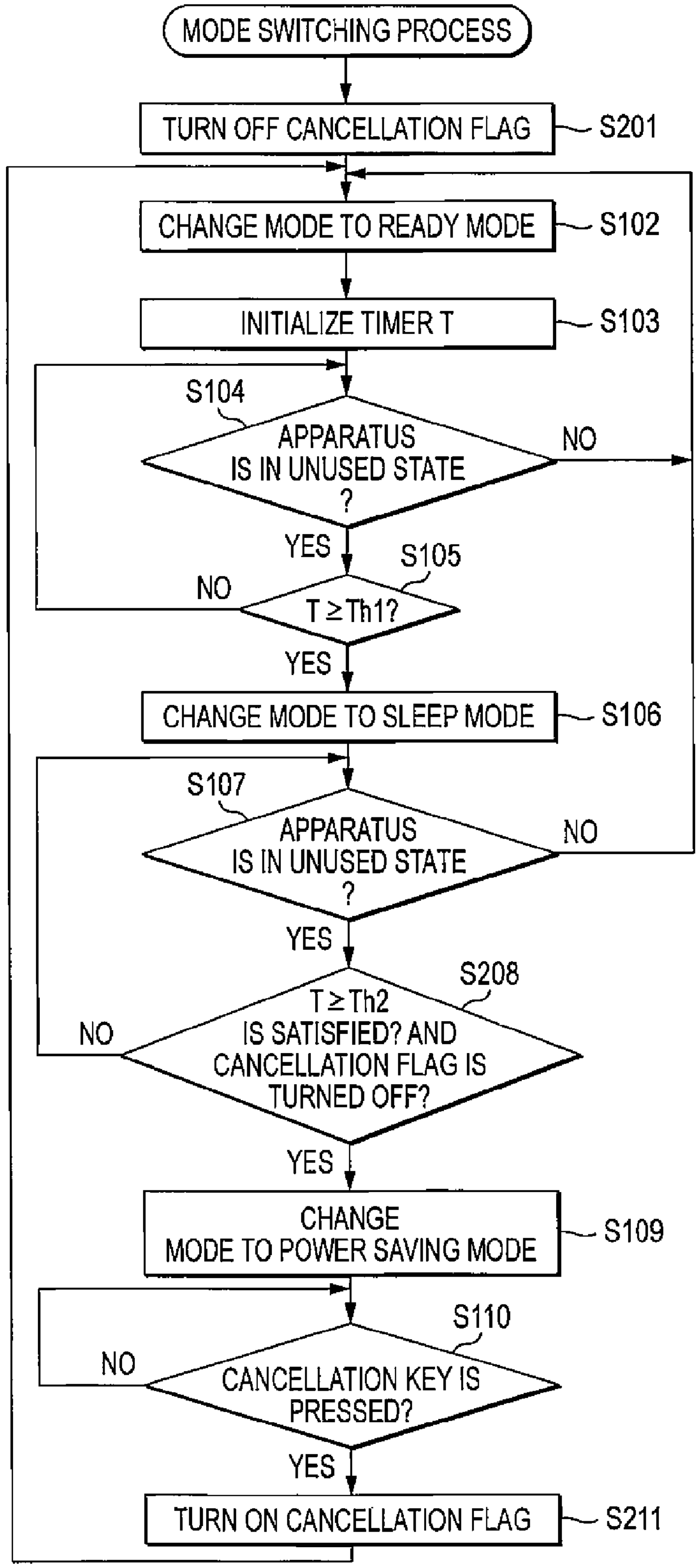
FIG. 9 is a flowchart illustrating the procedure of a mode switching process according to a third aspect.

Next, the procedure of a third aspect of the mode switching process (an example of a switching unit and a change unit) will be described with reference to the flowchart shown in FIG. 9. The third aspect is different from the first and second aspects in that, after the mode returns to the ready mode, the ready mode is not changed to the power saving mode. In the third aspect, the same steps as those in the first aspect or the second aspect are denoted by the same reference numerals and a description thereof will not be repeated.

In the third aspect, first, the MFP 100 turns off the cancellation flag (S201). Then, the mode is changed to the ready mode and the supply of power to various components of the MFP 100 starts (S102). Then, the timer T that measures the time for which the MFP 100 is not used is initialized to 0 and the timer T starts to measure time (S103).

Then, it is determined whether the MFP 100 is in an unused state (S104). When the MFP 100 is in the unused state (S104: YES), it is determined whether the value of the timer T is equal to or more than the threshold time Th1 (S105).

When the non-use time reaches the threshold time Th1 (S105: YES), the mode is changed to the sleep mode (S106). Then, it is continuously determined whether the MFP 100 is in the unused state (S107). When the MFP 100 is in the unused state (S107: YES), it is determined whether the value of the timer T is equal to or more than the threshold time Th2 and the cancellation flag is turned off (S208). The cancellation flag is turned off in the stage in which the mode is not changed to the power saving mode. When the conditions of Step S208 are not satisfied (S208: NO), the process returns to Step S107.

When the value of the timer T is equal to or more than the threshold time Th2 and the cancellation flag is turned off (S208: YES), the mode is changed to the power saving mode (S109). Then, it is determined whether the cancellation key 43 is pressed (S110). When the cancellation key 43 is pressed (S110: YES), the cancellation flag is turned on (S211). After Step S211, the process returns to Step S102 and the mode is changed to the ready mode.

When it is determined in Step S104 or S107 that the MFP is not in the unused state (S104: NO, S107: NO), the process returns to Step S102. The cancellation flag is not turned off and the mode is changed to the ready mode.

As described above, in the mode switching process according to the third aspect, after the mode returns from the power saving mode, the cancellation flag is maintained in an on state, and is not turned off. When the cancellation flag is in the on state, the conditions of Step S208 are not satisfied. That is, under the stop condition (second condition) after the mode returns from the power saving mode, no condition is satisfied. Therefore, when the user presses the cancellation key 43 to change the mode from the power saving mode to the ready mode, it is possible to reliably process the job of the user.

[Fourth Aspect]

Figure 10:
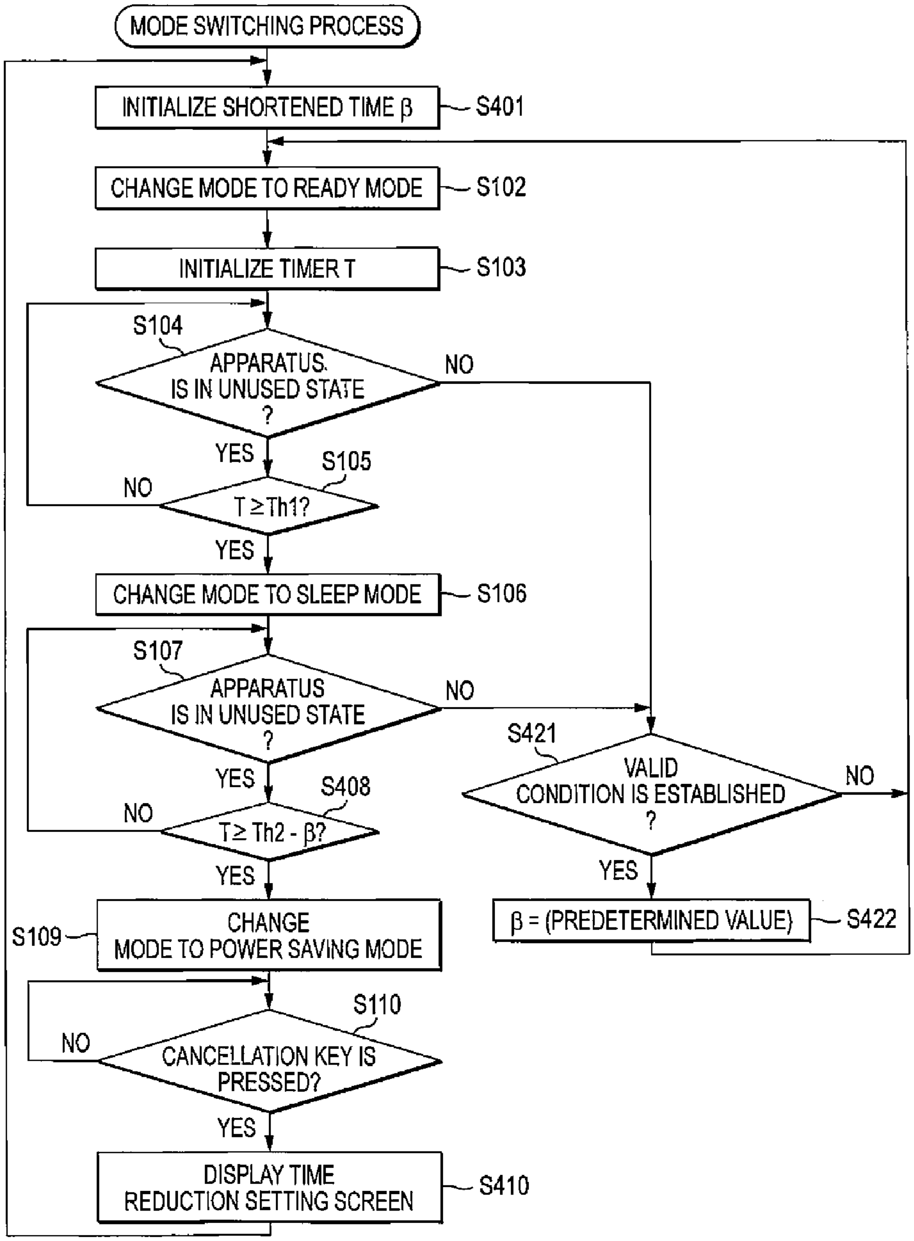
FIG. 10 is a flowchart illustrating the procedure of a mode switching process according to a fourth aspect.

Next, the procedure of a fourth aspect of the mode switching process (for example, an example of a change unit and a setting unit) will be described with reference to the flowchart shown in FIG. 10. In the fourth aspect, immediately after the power saving mode is cancelled, the stop condition is not changed. Thereafter, when valid conditions are satisfied, the stop condition is changed to a condition that is more likely to be satisfied than the stop condition immediately after the power saving mode is cancelled. This is the difference from the first aspect in which, immediately after the power saving mode is cancelled, the stop condition is changed to a condition that is less likely to be satisfied. The same steps as those in the first aspect are denoted by the same reference numerals and a description thereof will not be repeated.

In the fourth aspect, first, the MFP 100 initializes a shortened time β to 0 (S401). The shortened time β is used for the stop condition. Then, the mode is changed to the ready mode and the supply of power to various components of the MFP 100 starts (S102). Then, the timer T that measures the time for which the MFP 100 is not used is initialized to 0 and the timer T starts to measure time (S103).

Then, it is determined whether the MFP 100 is in an unused state (S104). When the MFP 100 is in the unused state (S104: YES), it is determined whether the value of the timer T is equal to or more than the threshold time Th1 (S105). When the non-use time does not reach the threshold time Th1 (S105: NO), the process returns to Step S104.

When the non-use time reaches the threshold time Th1 (S105: YES), the mode is changed to the sleep mode (S106). Then, it is continuously determined whether the MFP 100 is in the unused state (S107). When the MFP 100 is in the unused state (S107: YES), it is determined whether the value of the timer T is equal to or more than a time difference obtained by subtracting the shortened time β from the threshold time Th2 (S408). The threshold time Th2 is longer than the threshold time Th1. The shortened time β is 0 in the stage in which the mode is not changed to the power saving mode. When the non-use time does not reach the time difference between the threshold time Th2 and the shortened time β (S408: NO), the process returns to Step S107.

When the non-use time reaches the time difference obtained by subtracting the shortened time β from the threshold time Th2 (S408: YES), the mode is changed to the power saving mode (S109). Then, it is determined whether the cancellation key 43 is pressed (S110). When the cancellation key 43 is not pressed (S110: NO), the MFP waits for the pressing of the cancellation key 43 by the user.

When the cancellation key 43 is pressed (S110: YES), the supply of power to the control unit 30 and the operation panel 40 is resumed and a time reduction setting screen is displayed on the display unit 42 (S410). A valid condition that validates the shortened time β is set on the time reduction setting screen. The valid condition includes three conditions, that is, the execution of printing, the execution of reading, and the execution of a panel operation, similarly to the time extension setting screen according to the first aspect. The user sets the valid condition, if needed.

After the valid condition is set, the process returns to Step S401. The shortened time β is initialized to 0 and the mode is changed to the ready mode. That is, the supply of power to the image forming unit 1 and the image reading unit 2 is resumed. Immediately after the power supply is resumed, the value of the shortened time β is 0. The stop condition immediately after the mode returns to the ready mode is the same as the stop condition when the mode is changed to the power saving mode.

When it is determined in Step S104 or S107 that the MFP is not in the unused state, that is, when any one of printing, reading, and the panel operation is performed (S104: NO, S107: NO), it is determined whether the valid condition set on the time reduction setting screen is satisfied (S421). For example, when the valid condition is the panel operation, it is determined whether the panel operation has been performed. Since the valid condition is not set before the mode is changed to the power saving mode, the valid condition is not satisfied.

When the valid condition is satisfied (S421: YES), a predetermined value is substituted into the shortened time β (S422) and the process returns to Step S102. When the user can input the shortened time to the time reduction setting screen in Step S410, the input value may be substituted into the shortened time β. Then, the shortened time β set in Step S422 is used to determine whether to change the mode to the power saving mode in Step S408. Therefore, the time required to change the mode to the power saving mode is less than that before the valid condition is satisfied. That is, the stop condition is likely to be satisfied.

When the valid condition is not satisfied (S421: NO), the process returns to Step S102 without setting the shortened time β. When a plurality of valid conditions are set and at least one of the valid conditions is satisfied in Step S421, it is determined that the valid conditions are satisfied. When no valid condition is set, the shortened time β is not set since no valid condition is satisfied.

As described above, in the mode switching process according to the fourth aspect, after the mode returns from the power saving mode and when the valid condition, such as printing, is satisfied, it is possible to use the shortened time β and reduce the length of the non-use time required to change to the power saving mode. Therefore, the stop condition (fourth condition) after the mode returns from the power saving mode and the valid condition is satisfied is more likely to be satisfied than the stop condition (third condition) immediately after the mode is changed to the power saving mode. In this way, for example, after the printing of print data with the return of the mode to the ready mode ends, the mode can rapidly return to the power saving mode and it is possible to reduce power consumption.

Since the fourth condition is likely to be satisfied, an influence on a reduction in power consumption is small even when the third condition is preset to a condition that is less likely to be satisfied and the time until the user inputs, for example, an instruction to transmit print data is gained. Therefore, it can be expected to improve the convenience of the user while reducing the influence on a reduction in power consumption.

This embodiment is illustrative, but does not limit the invention. Therefore, various modifications and changes of the invention can be made without departing from the scope and spirit of the invention. For example, the invention is not limited to the MFP, but can be applied to any apparatuses having an image forming function or an image reading function, such as a printer, a copier, a scanner, and a FAX.

In the embodiment, the mode is changed from the ready mode to the sleep mode or from the sleep mode to the power saving mode according to the duration of the non-use time. However, the mode switching condition may not be the duration of the non-use time. For example, when the MFP 100 is connected to a plurality of PCs, the mode switching condition may be the number of PCs which can communicate with the MFP 100 at the present time. That is, as the number of PCs that can perform communication is reduced, the possibility of the MFP 100 being used is reduced. Therefore, for example, when the number of PCs that can perform communication is equal to or less than a predetermined value, the mode may be changed from the ready mode to the sleep mode or the power saving mode. In addition, for example, a photoresistor may be used to detect brightness around the apparatus and the mode may be changed from the ready mode to the sleep mode or the power saving mode when it is determined that the surroundings are dark.

In the embodiment, the MFP 100 has three modes, that is, the ready mode, the power saving mode, and the sleep mode, but the invention is not limited thereto. For example, the MFP 100 may have a structure in which the mode can be switched between two modes, that is, the ready mode and the power saving mode. In addition, the MFP 100 may have other modes (for example, a deep sleep mode in which the supply of power to the communication system (the network interface 36 and the FAX interface 38) of the control unit 30 is cut for the period for which the mode is changed from the sleep mode to the power saving mode).

In the embodiment, the control unit 30 controls both the operation panel 40 and the communication system. However, the communication system may be controlled by a separate control system. In this case, a mode may be provided in which the supply of power to the control system of the communication system is cut and the supply of power to the operation panel 40 is maintained. In this case, the key for resuming the supply of power to the control system of the communication system is not limited to the dedicated key, such as the cancellation key 43, but it may be a key which is provided in the operation panel 40 and is used for a different purpose.

In the embodiment, when the mode returns from the power saving mode to the ready mode, the MFP inquires the setting of various kinds of conditions of the user (S111 and S210). However, the extended time α, the cancellation condition, and user registration may be set to the fixed values of the apparatus. In addition, the printer driver 21 incorporated into the PC 200 may be used to display a screen equivalent to the time extension setting screen or the user setting screen such that various kinds of conditions can be set from the PC 200.

In the embodiment, the "non-use time" is the duration for which no printing, reading, and user operations are performed, but the invention is not limited thereto. For example, the non-use time may be the duration for which neither printing nor reading is performed. That is, even when there is a user operation, the MFP may be maintained in the unused state.

The embodiment can be applied when reading is performed, in addition to when printing is performed, that is, when print data is input from the PC 200 to the MFP 100 and the MFP 100 performs printing. For example, the embodiment can be applied to a case in which the user sets a document on the MFP 100 and inputs a scan instruction to the MFP 100 using the PC 200 and the MFP 100 starts to read the document in response to the scan instruction.

What is claimed is:

1. An image forming apparatus comprising:

a network interface configured to receive print data transmitted from an external apparatus;

a printing unit configured to print the print data received by the network interface;

a power feed unit including a non-power saving mode in which power is supplied to the network interface and a power saving mode in which no power is supplied to the network interface, the power feed unit configured to change the mode to control the supply of power to the network interface;

an input unit configured to receive an input of a switching instruction to switch the mode of the power feed unit from the power saving mode in which no power is supplied to the network interface to the non-power saving mode in which power is supplied to the network interface, wherein the input unit is different from the network interface;

a display; and a controller configured to:

determine whether a first predetermined time has passed during the non-power saving mode in which power is supplied to the network interface, when the controller determines that the first predetermined time has passed, switch the mode of the power feed unit from the non-power saving mode in which power is supplied to the network interface to the power saving mode in which no power is supplied to the network interface, determine whether the switching instruction has been received by the input unit after the mode of the power feed unit has been switched from the non-power saving mode in which power is supplied to the network interface to the power saving mode in which no power is supplied to the network interface, when the controller determines that the switching instruction has been received by the input unit, switch the mode of the power feed unit from the power saving mode in which no power is supplied to the network interface to the non-power saving mode in which power is supplied to the network interface, determine whether a second predetermined time has passed after the mode of the power feed unit has been switched from the power saving mode in which no power is supplied to the network interface to the non-power saving mode in which power is supplied to the network interface by the switching instruction, and when the controller determines that the second predetermined time has passed, switch the mode of the power feed unit from the non-power saving mode in which power is supplied to the network interface to the power saving mode in which no power is supplied to the network interface, wherein the second predetermined time is longer than the first predetermined time, wherein in the power saving mode, since no power is supplied to the network interface, transmission and reception of data between the external apparatus is disabled, and wherein the controller is further configured to:

when the controller determines that the switching instruction has been received by the input unit, display a setting screen for setting an extended time on the display;

set the extended time, which is not zero, based on a time set via the setting screen; and calculate the second predetermined time by adding the extended time to the first predetermined time.

2. The image forming apparatus according to claim 1, wherein the controller is further configured to:

determine whether the printing unit prints the print data before the second predetermined time has passed; and in response to determining that the printing unit prints the print data before the second predetermined time has passed, set the extended time to zero.

3. The image forming apparatus according to claim 2, wherein the controller is further configured to:

identify a user who inputs the switching instruction;

determine a user who has the print data received by the network interface, and in response to determining that the printing unit prints the print data before the second predetermined time has passed, determine a user who has the print data received by the network interface and set the extended time to zero on condition that the determined user is identical to the identified user.

* * * * *